United States Patent [19]

Matteodo

[11] Patent Number: 5,132,344
[45] Date of Patent: Jul. 21, 1992

[54] STABILIZED POLYETHYLENE COMPOSITION

[75] Inventor: Jean-Baptiste Matteodo, Martigues, France

[73] Assignee: BP Chemicals Limited, London, England

[21] Appl. No.: 697,902

[22] Filed: Apr. 30, 1991

Related U.S. Application Data

[63] Continuation of Ser. No. 423,756, Oct. 18, 1989, abandoned.

[30] Foreign Application Priority Data

Oct. 21, 1988 [FR] France ................. 88 14083

[51] Int. Cl.$^5$ ............................. C08K 5/3492
[52] U.S. Cl. .................. 524/101; 524/131; 524/291; 524/289; 524/342; 524/333; 524/349; 524/350; 524/432
[58] Field of Search ............ 524/101, 131, 291, 289, 524/333, 350, 349, 432, 342

[56] References Cited

U.S. PATENT DOCUMENTS

| | | | |
|---|---|---|---|
| 3,248,351 | 4/1966 | Ray ................................. | 524/399 |
| 3,376,250 | 4/1968 | Newland et al. ................. | 260/41 |
| 3,376,250 | 4/1968 | Newland et al. ................. | 524/432 |
| 3,386,948 | 6/1968 | Needham et al. ................ | 524/336 |
| 3,923,760 | 12/1975 | Mullikin et al. ................ | 260/94.9 |
| 4,251,407 | 2/1981 | Schroeder et al. ............. | 524/432 |
| 4,251,407 | 2/1981 | Schroeder et al. ............. | 524/432 |
| 4,261,880 | 4/1981 | Fujii et al. ...................... | 524/583 |
| 4,576,983 | 3/1986 | Chatterjee et al. ............. | 524/101 |
| 4,844,961 | 7/1989 | Akao ................................ | 524/580 |
| 4,859,733 | 8/1989 | Mitchell et al. ................. | 524/432 |

FOREIGN PATENT DOCUMENTS

| | | |
|---|---|---|
| 206413 | 12/1986 | European Pat. Off. . |
| 0206413 | 12/1986 | European Pat. Off. . |
| 2253031 | 4/1968 | France . |
| 2346399 | 10/1977 | France . |
| 4767542 | 3/1974 | Japan . |
| 49-27537 | 12/1974 | Japan . |
| 54-119546 | 9/1979 | Japan . |
| 54119546 | 2/1981 | Japan . |
| 819277 | 9/1959 | United Kingdom . |
| 830924 | 3/1960 | United Kingdom . |
| 1514903 | 6/1978 | United Kingdom . |

OTHER PUBLICATIONS

George K. Cowell "Additives for Plastics-Antioxidants" Plastics Engineering, Oct. 1976 pp. 51-57.

G. J. Klender et al. "Antioxidant Induced Color and Its Prevention in Polyolefin Polymers" ANTEC '85 pp. 989-996.

G. J. Klender et al. "Further Studies... Polyolefetins" Presentation made Jan. 1987, at ANTEC '87 session at Houston Texas pp. 225-245.

J. E. Kresta Tech. Pap. Reg. Tech. Conf.-Soc. Plast. Eng. (Plast. Prog. Process) May 5-8, 1980, pp. 478-480.

Primary Examiner—Veronica P. Hoke
Attorney, Agent, or Firm—Brooks Haidt Haffner & Delahunty

[57] ABSTRACT

A stabilized polyethylene composition containing catalyst residues comprising at least one transition metal comprises (a) polyethylene, (b) 100 to 2000 ppm by weight based on the total weight of the composition of one or more antioxidants of the phenolic type and (c) 100 to less than 2000 ppm by weight, based on the total weight of the composition of zinc oxide but substantially no calcium stearate. The composition has improved color and improved resistance to coloration effects.

11 Claims, No Drawings

STABILIZED POLYETHYLENE COMPOSITION

This application is a continuation of application Ser. No. 07/423,756, filed on Oct. 18, 1989, now abandoned.

The present invention relates to a stabilized polyethylene composition and in particular to a stabilized polyethylene composition containing catalyst residues comprising at least one transition metal belonging to groups IV, V or VI of the Periodic Table of the Elements. The compositions according to the present invention have improved colour and improved resistance to colouration. The invention also relates to a process for improving the colour and resistance to colouration of a stablized polyethylene composition.

Polyolefins which contain acidic catalyst residues can corrode the thermomechanical equipment used during the processing and fabrication of the polyolefins into finished articles. Neutralising agents, particularly basic compounds such as calcium stearate, can be incorporated into such polyolefins in order to reduce the corrosivity of the compositions. Although these neutralising agents can reduce the problem of the corrosivity of the polyolefin they can cause other problems. For example, some of the most commonly used neutralising agents, particularly calcium stearate, have the disadvantage that polyolefins containing them can give a disagreeable taste to foods with which they are placed in contact.

Polyolefins are also known to undergo degradation during their thermomechanical conversion to pellets or finished articles and they also degrade with time. Such degradation can manifest itself as a deterioration of the colour of the polyolefin. Antioxidants are usually incorporated into the polyolefins to mitigate this problem. Particularly effective antioxidants for use in polyolefins are the sterically hindered phenolic antioxidants. Unfortunately, it has been found that, polyolefins containing catalyst residues which comprise transition metals such as titanium, vanadium, chromium or zirconium can be undesirably coloured when stabilized with a phenolic-type antioxidant.

U.S. Pat. No. 3,923,760 discloses a method of treating polyolefins, the catalyst residues of which contain vanadium, to improve the colour of the polyolefin. The method comprises intimately contacting the polyolefin in the molten state with an alkanol having from two to four carbon atoms and then removing all of the alkanol by evaporation. The treatment with the alkanol can be carried out in the presence of a basic compound such as an oxide or hydroxide or carbonate of a metal of Groups I or II of the Periodic Table. This process has practical difficulties because of the requirement to remove all of the alcohol. It may, for example, require the use of an extruder having a special degassing section. According to the patent, additives such as stabilizers and antioxidants do not appear to affect the decolourization in any way, but measured colour may not be as good when such additives are present.

European patent application EP 206 413 discloses a stabilizing system for organic polymers comprising a phenolic antioxidant and extremely reduced amounts of at least one zinc or aluminium compound. The amount of the zinc or aluminium compound is from 50 to 10,000 parts per million by weight (ppm), expressed as metal relative to the phenolic antioxidant. Preferably the amount of the zinc or aluminium compound is 100 to 5,000 ppm. The amount of the stabilizer used in the polymer is from 0.005 to 10% by weight, preferably 0.01 to 4% by weight. The European application teaches that the use of zinc or aluminium compounds in amounts exceeding 10,000 ppm, expressed as metal relative to the phenolic antioxidant, generally have a negative effect on the stabilizer activity, which tends to decrease, sometimes to a level below that obtainable by using the phenolic antioxidant alone.

Japanese patent application JA 47-67542, published under the number JA 49-27537 addresses the problem of providing an antistatic polyolefin. The process claimed comprises adding to the polyolefin at least two different compounds selected from carboxylates, carbonates and oxides of metals of Group II of the Periodic Table. As a comparative composition there is disclosed, as Example 9, a composition comprising polyethylene, 1,000 ppm of a phenolic-type antioxidant and 2,000 ppm of zinc oxide.

It has now been found that the colour and resistance to colouration of a stabilized polyethylene composition containing catalyst residues comprising at least one transition metal belonging to Group IV, V or VI of the periodic Table of the Elements can be surprisingly improved by the incorporation therein of a phenolic-type antioxidant and an amount of zinc oxide falling within a relatively small range.

Thus, according to the present invention, a stabilized polyethylene composition containing catalyst residues comprising at least one transition metal belonging to Groups IV, V or VI of the Periodic Table of the Elements is characterized in that it comprises;

(A) polyethylene (B) 100 to 2,000 ppm by weight, based on the total weight of the composition, of one or more antioxidants of the phenolic-type, and (C) 100 to less than 2,000 ppm by weight, based on the total weight of the composition, of zinc oxide, and further characterised in that the composition is substantially free of calcium stearate.

The invention includes a process for improving the colour and resistance to colouration effects of a polyethylene containing catalyst residues comprising at least one transition metal belonging to groups IV, V and VI of the Periodic Table of the Elements characterised in that (a) from 100 to 2,000 ppm by weight, based on the total weight of the composition, of one or more antioxidants of the phenolic type and (b) from 100 to less than 2,000 ppm based on the total weight of the composition of zinc oxide are incorporated into the polyethylene, in the substantial absence of calcium stearate.

Polyethylene containing catalyst residues comprising at least one transition metal are known. They can be homopolymers or copolymers of ethylene produced using a catalytic system of the Ziegler-Natta type or a catalyst based on chromium oxide activated by a heat treatment. The polyethylene can be produced by any of the known processes i.e. by polymerization in the gas-phase, solution or suspension. Preferably, the polyethylene is a homopolyethylene or a copolymer of ethylene with one or more alpha-olefin having from 3 to 12 carbon atoms, preferably selected from propylene, 1-butene, 1-hexene, 1-octene and 4-methyl-1-pentene. The invention has been found to be particularly suitable for high density polyethylene, linear low density polyethylene and very low density polyethylene.

The polyethylene will generally contain catalyst residues comprising a transition metal selected from the group consisting of titanium, vanadium, zirconium and chromium. The concentration by weight of the transition metal in the polyethylene is generally from 1 to 100 ppm, more specifically 2 to 50 ppm. The catalyst residues can also include a halogen, such as chlorine or bromine. When present, the halogen content is generally from 10 to 500 ppm, more specifically from 50 to 200 ppm.

The composition according to the present invention contains from 100 to 2,000 ppm of an antioxidant of the phenolic type. Preferably the amount of antioxidant is from 100 to 1000 ppm. Such antioxidants, often referred to as "long-term antioxidants", ensure that the polyethylene composition is adequately protected against oxidation effects during the whole of its service life. Phenolic type antioxidants are well known and include, for example; 1,3,5-tris (3', 5'-di-tert-butyl-4'-hydroxybenzyl)-2,4,6-trimethyl benzene, 1,3,5-tris(4'-tert-butyl-5'-hydroxy-2',6'-dimethylbenzyl) isocyanurate, 1,3,5-tri (3',5'-di-tert-butyl-4'-hydroxybenzyl) isocyanurate), pentaerythrityl tetrakis (3-(3',5'-di-tert-butyl-4'-hydroxyphenyl)propionate), 2,2'-di(3,5-di-tert-butyl-4-hydroxyphenyl-3-propionate)thiodi-ethane, octadecyl 3-(3',5'-di-tert-butyl-4'-hydroxyphenyl)propionate, calcium monoethyl-3,5-di-tert-butyl-4-hydroxybenzylphosphonate, 2,5-distyrylnonylphenol, 4,4'-thiobis (3-methyl-6-tert. butylphenol), 1,1,3-tris(2'-methyl-4'-hydroxy-5'-tert-butylphenyl) butane, and 2,6-di-tert-butylparacresol.

The zinc oxide is preferably relatively pure and can for example have a purity greater than 96%, preferably greater than 98% and most preferably the zinc oxide is greater than 99.5% pure. The zinc oxide is preferably used as a powder having a weight average mean diameter from 0.05 to 2.0 $\mu$m, preferably of 0.1 to 2.0 $\mu$m. These particles can have a specific surface area (B.E.T.) of 1 to 20 m$^2$/g, and an apparent bulk density of 0.2 to 1.0 g/cm$^3$. Advantageously, a zinc oxide which conforms with the standards of the pharmaceutical index can be used.

Surprisingly, the improvement in the colour and the resistance to colouration which is achieved by adding zinc oxide to a polyethylene, which contains catalyst residues comprising a transition metal and which is stabilized with an antioxidant of the phenolic type, is only achieved when the amount of zinc oxide is within a relatively narrow range. The amount of zinc oxide must be less than 2,000 ppm because at this concentration and above, the balance of properties which is sought is no longer achieved. In particular, the optical properties of a film formed from the composition can be impaired. Preferably, the maximum amount of zinc oxide used in the compositions according to the present invention is about 1700 ppm and is preferably not more than 1500 ppm. Also, if the amount of zinc oxide is too small, no appreciable improvement in the colour is observed. Thus, although it has been suggested that zinc oxide can be included in polyolefin compositions, for example as a neutralising agent or an antistatic agent, it is quite unexpected that the colour and resistance to colouration of a polyethylene stabilized with a phenolic type antioxidant can be improved by the addition of zinc oxide within a narrowly defined range. The compositions according to the present invention have a high degree of whiteness and maintain a remarkable resistance to colouration effects throughout their service life. The compositions can therefore be stabilised and have their colour and resistance to colouration improved by the use of only two additives viz the phenolic antioxidant and the small amount of zinc oxide. The compositions are also satisfactorily neutralized in order to mitigate the possible corrosive effects of acidic catalyst residues.

It has surprisingly been noted that the inclusion of certain other neutralizing agents can adversely affect the colour of the composition, in particular by reducing its whiteness and weakening its resistance to colouration with time. In particular an effect of this type has been observed with calcium stearate, a commonly used neutralising agent. The compositions according to the present invention contain substantially no calcium stearate.

Other additives which can adversely affect the colour of the polyethylene should be avoided, if possible. Also the compositions should not contain additives which can affect the taste of food which is placed in contact with the polyethylene. It is therefore desirable to avoid including in the compositions according to the present invention, any ester of a higher carboxylic acid of a metal of Group II of the Periodic Table of the elements, such as zinc, calcium, cadmium, barium or lead. The higher carboxylic acids are those having at least ten carbon atoms. In order not to adversely affect the properties of the compositions according to the present invention, it is also preferable that they do not contain any carbonates or any oxide of a Group II metal other than zinc oxide.

The present invention has the advantage of making it possible to provide a stabilized polyethylene composition which has improved colour and resistance to colouration effects, is suitable for use in food applications and is satisfactorily neutralized without the need for more than the defined amounts of zinc oxide and phenolic antioxidant. Indeed as indicated above, it is preferable to avoid certain additives such as metal carboxylates which are commonly used in such compositions. Nevertheless, it may be desirable to include certain other additives in the compositions, depending on their intended application. For example, the compositions can contain (a) UV stabilizers such as benzophenone, a sterically hindered amine, a nickel complex, an oxamide, a benzoate or a benzotriazole, (b) anti-static agents, such as an ethoxylated tertiary amine, glycol monostearate or a glyceride, (c) antioxidants which act specifically during the thermomechanical processing and forming of the polyethylene compositions, which are generally known as "process antioxidants", such as a phosphorous compound or a sulphur compound, (d) slip agents, such as an amide, (e) antiblocking agents such as silica, (f) flame retardants, (g) nucleating agents and (h) those compounds commonly known as "synergistic antioxidants", such as thioesters. If required, crosslinkable compositions according to the present invention can be prepared by incorporating a free-radical generator, such as an organic peroxide or hydroperoxide or a compound having an azo group. Fillers such as silica, talc or titanium oxide can also be included in the compositions according to the present invention.

The compositions according to the present invention contain substantially no calcium stearate and preferably no other carboxylates of metal of Group II of the Periodic Table. However, some fillers may be coated with a metal caboxylate, such as zinc stearate. Although it may be preferable to avoid the use of such coated fillers, they can be used in the compositions according to the present invention provided that they do no adversely affect the properties of the compositions to an unacceptable extent.

The compositions according to the present invention can be prepared using known techniques and apparatus for incorporating additives into polyolefins. The phenolic-type antioxidant and zinc oxide can be added to the polyolefin simultaneously or sequentially. If they are added sequentially it is not important which is added first. Advantageously a masterbatch can be prepared in which the antioxidant of the phenolic type and the zinc oxide are incorporated into a polyolefin at relatively high concentrations and then this masterbatch is blended with the polyethylene. Preferably the polyolefin used to form the masterbatch is the same as the polyethylene with which the masterbatch is blended. Other additives, if used, can be incorporated in the masterbatch. A simple method of producing a polyethylene composition according to the present invention comprises dry mixing the polyethylene in the form of powder or pellet with zinc oxide and the antioxidant of the phenolic type at a temperature below that at which the polyethylene melts, then thermoforming the mixture obtained into pellets or a finished article at a temperature equal to or greater than the melting temperature. The thermoforming process is any process in which the polymer is heated above its melting temperature and formed and can be, for example, compression moulding, injection moulding, blow moulding, roto moulding, extruding or film blowing processes. The compositions can be formed into finished articles such as moulded articles, pipe and film. The compositions are particularly suitable for the manufacture of film and especially film produced by the blown bubble process.

Colour Measurement

The colour of a composition according to the present invention can be determined using the standard test method ASTM E 313-73, using a colorimeter such as, for example, a "Hunterlab D 25-M9". The value of the whiteness index (WI) is larger the whiter the product.

Corrosion measurement

The tendency of a polyolefin composition to cause corrosion during a thermomechanical forming process can be assessed using a rectangular parallelepiped mould, the lower face of which comprises a removable steel plate, 165 mm long, 120 mm wide and 0.2 mm thick. The corrosion test comprises maintaining the polyolefin composition in the mould in the molten state at a temperature of 300° C. for a period of 30 minutes. At the end of this time, the mould is cooled to ambient temperature, the polyolefin composition is removed from the mould and the steel plate is recovered and exposed to the atmosphere for 24 hours. Subsequently, the corrosion of the plate is assessed by comparing the number and size of the spots of corrosion which have appeared on the steel plate during the test with a series of standard plates which have been corroded to a greater or lesser extent.

The invention is illustrated by the following examples.

EXAMPLES 1 to 4 and COMPARATIVE EXAMPLES 5 to 7

Four polyethylene compositions according to the present invention were prepared by mixing together a linear low density polyethylene, zinc oxide and an antioxidant of the phenolic type.

The linear low density polyethylene used was a commercially available LLDPE powder sold by BP Chemicals under the trade designation "Innovex LL 0209 AP". (INNOVEX is a registered trademark.) The polymer had a density of 0.9185 g/cm$^3$, a melt flow index (190° C., 2.16 kg) of 1.0 g/10 minutes, a titanium content of 16 ppm and a chlorine content of 115 ppm.

The zinc oxide had a purity of 99.8% by weight and was in the form of particles having a weight average means diameter of 0.5 μm, a specific surface area (BET) of 3 m$^2$/g and an apparent bulk density of 0.45 g/cm$^3$.

The antioxidant of the phenolic type was pentaerythrityltetrakis (3-(3', 5'-di-tertiary butyl-4'-hydroxyphenyl) propionate) sold by Ciba Geigy (Switzerland) under the trade designation "Irganox 1010" (IRGANOX is a registered trade mark).

The composition also contained tetrakis (2", 4" ditert.butylphenyl)-4, 4' bi-phenylene-diphosphonite sold by Ciba Geigy (Switzerland) under the trade designation "Irgafos P-EPQ" (IRGAFOS is a registered trade mark) alone or together with, tris (2', 4' ditert.butylphenyl) phosphite sold by Ciba Geigy under the trade designation "Irgafos 168".

The amount of the additives blended with the polyethylene are given in Table 1. The homogeneous mixtures were formed into pellets using a twin-screw Werner 53 ZSK extruder, sold by the company Werner (Germany). The screw speed was 150 rpm and the extruder was operated at a temperature of about 200° C.

The pellets were used to measure the corrosion and colour of the compositions. 2 mm thick plaques, which were prepared from the pellets using a "Billion BH 80-50" injection moulding machine, were used to assess the colour. The colour measurement technique hereinbefore described was used to determine the initial whiteness index (WIo) as well as the whiteness index determined after 40 days at 80° C. and after three months at 23° C. The results are given in Table 2.

The corrosion measurement technique hereinbefore described was used to assess the corrosivity of the compositions. All of the compositions according to the present invention exhibited an extremely low level of corrosion and were consequently considered to be satisfactorily neutralised.

For comparison, Examples 2, 3 and 4 were repeated except that the zinc oxide was replaced by calcium stearate. These comparative compositions, Examples 5, 6 and 7 also exhibited a low level of corrosion but had a lower initial whiteness index (WIo), as shown in Table 2. The comparative compositions were, in addition, more prone to colouration.

TABLE 1

Percentages by weight of additives used in the compositions

| % by weight | 1 | 2 | 3 | 4 | 5 (comp) | 6 (comp) | 7 (comp) |
|---|---|---|---|---|---|---|---|
| Calcium stearate | | | | | 0.10 | 0.10 | 0.10 |
| Zinc oxide | 0.10 | 0.10 | 0.10 | 0.10 | | | |
| IRGANOX 1010 | 0.03 | 0.03 | 0.03 | 0.03 | 0.03 | 0.03 | 0.03 |
| IGRANOX 168 | | | 0.10 | 0.08 | | 0.10 | 0.08 |
| IGRAFOS P-EPQ | 0.12 | 0.10 | 0.05 | 0.05 | 0.12 | 0.05 | 0.05 |

TABLE 2

Whiteness indices for the compositions

| Colour | Examples | | | | | | |
|---|---|---|---|---|---|---|---|
| | 1 | 2 | 3 | 4 | 5 (comp) | 6 (comp) | 7 (comp) |
| WIo | 68 | 67 | 66 | 65 | 58 | 60 | 60 |
| Colour at 80° C.: | | | | | | | |
| After 40 days | 59 | 59 | 55 | 54 | 44 | 43 | 42 |
| Colour at 23° C.: | | | | | | | |
| After 3 months | 66 | 65 | 64 | 63 | 53 | 58 | 58 |

EXAMPLE 8 and COMPARATIVE EXAMPLES 9, 10 and 11

A polyethylene composition was prepared as described for Example 2 except that the linear low density polyethylene used contained 13 ppm of titanium and 93 ppm of chlorine. The measurements of the initial whiteness index and the whiteness indices after maintaining at 80° C. for different periods and after two months at 23° C. are given in Table 4. The composition exhibited an extremely low level of corrosion.

For comparison, three comparative compositions were prepared (Examples 9, 10 and 11). The additives used and their contents in the polyethylene are indicated in Table 3. Comparative Example 9 was the same as Example 8 except that the zinc oxide was replaced by calcium stearate. In Comparative Example 10 the zinc oxide was replaced by calcium hydroxide and in Example 11 50% of the zinc oxide was replaced by calcium stearate. These comparative compositions also exhibited an extremely low level of corrosion but the whiteness indices reported in Table 4 show that the composition according to the present invention had the highest whiteness values. It is apparent from Example 8 and Comparative Example 11 that replacing part of the zinc oxide with calcium stearate reduces the whiteness of the composition.

TABLE 3

Percentages by weight of the additives used in the compositions

| % by weight | Examples | | | |
|---|---|---|---|---|
| | 8 | 9 (comp) | 10 (comp) | 11 (comp) |
| Calcium stearate | | 0.10 | | 0.05 |
| Zinc oxide | 0.10 | | | 0.05 |
| Calcium hydroxide | | | 0.10 | |
| IRGANOX 1010 | 0.03 | 0.03 | 0.03 | 0.03 |
| IRGAFOS P-EPQ | 0.10 | 0.10 | 0.10 | 0.10 |

TABLE 4

Whiteness indices for the compositions

| Colour | Examples | | | |
|---|---|---|---|---|
| | 8 | 9 (comp) | 10 (comp) | 11 (comp) |
| WIo | 72 | 62 | 57 | 68 |
| Colour at 80° C.: | | | | |
| After 10 days | 69 | 58 | 56 | 65 |
| After 21 days | 67 | 53 | 52 | 62 |
| After 29 days | 63 | 48 | 49 | 59 |
| After 42 days | 61 | 42 | 46 | 55 |
| Colour at 23° C: | | | | |
| After 2 months | 71 | 59 | 55 | 67 |

EXAMPLES 12, 13 and 14

Three polyethylene compositions were prepared substantially as described for Examples 1 to 4 except that the amount of the additives included in the polyethylene were changed. Table 5 gives the concentrations as percentages by weight based on the total weight of the composition of the additives and also the results of the measurements of the initial whiteness index for each composition and the whiteness index (WIo) after 40 days at 80° C. for Examples 13 and 14. All of the compositions had a high initial whiteness index and the results for Examples 13 and 14 demonstrate that the compositions had a good resistance to colouration.

EXAMPLES 15 and 16 and COMPARATIVE EXAMPLE 17

Three polyethylene compositions were prepared as described for Examples 1 to 4 except that the amounts of the additives included in the polyethylene were changed. Table 6 gives the concentrations, as percentages by weight of the total weight of the composition, of the additives. In comparative Example 17, the percentage by weight of the zinc oxide was 0.20% (i.e. 2000 ppm). The initial whiteness index (WIo) for each composition is given in Table 6 and the results show that the initial whiteness index of the comparative composition which contained 2000 ppm of zinc oxide was very much lower than the initial whiteness index of the compositions of Examples 15 and 16 which contained 500 ppm and 1500 ppm respectively.

TABLE 5

Percentages by weight of the additives used in the compositions and the whiteness indices.

| % by weight | Examples | | |
|---|---|---|---|
| | 12 | 13 | 14 |
| Zinc oxide | 0.05 | 0.05 | 0.10 |
| IRGANOX 1010 | 0.02 | 0.03 | 0.03 |
| IGRAFOS P-EPQ | 0.10 | 0.05 | 0.05 |
| IRGAFOS 168 | — | 0.08 | 0.10 |
| Colour | | | |
| WIo | 69 | 67 | 71 |
| WI (after 40 days at 80° C.) | — | 56 | 59 |

TABLE 6

Percentages by weight of the additives used in the compositions and the whiteness indices.

| % by weight | Examples | | |
|---|---|---|---|
| | 15 | 16 | 17 (comp.) |
| Zinc oxide | 0.05 | 0.15 | 0.20 |
| IRGANOX 1010 | 0.02 | 0.02 | 0.02 |
| IRGAFOS 168 | 0.08 | 0.08 | 0.08 |
| Colour | | | |
| WIo | 63 | 64 | 31 |

COMPARATIVE EXAMPLES 18 to 20 and EXAMPLES 21 to 24

Four polyethylene compositions according to the present invention and three comparative compositions were prepared substantially as described for Examples 1 to 4 except that the compositions contained by weight 0.02% of Irganox 1010, 0.05% of Irgafos P-EPQ, 0.08% of Irgafos 168 and different amounts of zinc oxide. The amount of zinc oxide and the initial whiteness index for each composition are given in Table 7.

The results show that in the absence of zinc oxide (Comparative Example 18) the initial whiteness index was relatively low. When the compositions contained less than 100 ppm of zinc oxide (Comparative Examples 19 to 20) the initial whiteness index was even lower than when no zinc oxide was used. However, the compositions according to the present invention (Examples 21 to 24) containing from 100 to 1000 ppm of zinc oxide had relatively high initial whiteness indices.

TABLE 7

Percentages by weight of zinc oxide in the compositions and the whiteness indices obtained.

| Examples | Zinc oxide (% by weight) | Colour: Wlo |
| --- | --- | --- |
| 18 (comp.) | 0 | 51 |
| 19 (comp.) | 0.002 | 43 |
| 20 (comp.) | 0.005 | 42 |
| 21 | 0.01 | 56 |
| 22 | 0.02 | 57 |
| 23 | 0.05 | 61 |
| 24 | 0.10 | 71 |

I claim:

1. A coloration stabilized polyethylene composition having improved whiteness containing catalyst residues comprising at least one transition metal belonging to groups IV, V or VI of the Periodic Table of the Elements characterised in that the composition comprises:
   (A) polyethylene
   (B) 100 to 2,000 ppm by weight, based on the total weight of the composition, of one or more antioxidants of the phenolic type and
   (C) about 500 to 1700 ppm by weight, based on the total weight of the composition, of zinc oxide, and further characterised in that the composition is substantially free of calcium stearate.

2. A composition as claimed in claim 1 in which the polyethylene is a homopolymer of ethylene or a copolymer of ethylene with one or more olefins selected from the group consisting of propylene, 1-butene, 4-methylpentene-1, 1-hexene and 1-octene.

3. A composition as claimed in claim 2 in which the polyethylene is a high density polyethylene a linear low density polyethylene or a very low density polyethylene.

4. A composition as claimed in claim 1 in which the catalyst residues comprise titanium, vanadium, zirconium or chromium.

5. A composition as claimed in claim 1 in which the catalyst residues also comprise a halogen.

6. A composition as claimed in claim 1 in which the zinc oxide has a purity greater than 96% by weight and is present in the form of particles having a mass average mean diameter in the range 0.1 to 2 micron.

7. A composition as claimed in claim 1 in which the antioxidant of the phenolic-type is selected from the group consisting of: 1,3,5-tris(3',5'-di-tert-butyl-4'-hydroxybenzyl)-2,4,6-trimethyl benzene, 1,3,5-tris(4'-tert-butyl-5'-hydroxy-2,6 dimethyl benzyl) isocyanurate, 1,3,5-tris(3',5'-di-tert-butyl-4'-hydroxybenzyl-)isocyanurate, pentaerythrityl tetrakis (3(3',5'-di-tert-butyl-4'-hydroxyphenyl)propionate, 2,2'-di (3,5-di-tert-butyl-4-hydroxyphenyl-3-propionate) thiodi-ethane, octadecyl 3-(3',5'-di-tert-butyl-4'-hydroxyphenyl)propionate, calcium monoethyl-3,5-di-tert-butyl-4-hydroxybenzylphosphonate, 2,5-distyrylnonylphenol, 4,4'-thiobis(3-methyl-6-tert.butylphenol) 1,1,3-tris(2'-methyl-4'-hydroxy-5'-tert-butylphenyl) butane, and 2,6-di-tert-butylparacresol.

8. A process for improving the colour and resistance to colouration effects of a polyethylene containing catalyst residues comprising at least one transition metal belonging to groups IV, V and VI of the Periodic Table of the Elements characterised in that (a) from 100 to 2,000 ppm by weight, based on the total weight of the composition of one or more antioxidants of the phenolic type and (b) from about 500 to 1700 ppm based on the total weight of the composition of zinc oxide are incorporated into the polyethylene, in the substantial absence of calcium stearate.

9. A process as claimed in claim 8 in which the polyethylene is in the form of a powder or pellets and it is mixed with the zinc oxide and antioxidant at a temperature below the melting temperature of the polyethylene and then the blend is thermoformed into pellets or finished articles at a temperature equal to or greater than the melting temperature of the polyethylene.

10. A composition as claimed in claim 1, wherein said composition contains from about 1000 to 1700 ppm by weight of zinc oxide based on the total weight of the composition.

11. A process as claimed in claim 10, wherein from about 1000 to 1700 ppm by weight of zinc oxide based on the total weight of the composition are incorporated into the plyethylene.

* * * * *

UNITED STATES PATENT AND TRADEMARK OFFICE
CERTIFICATE OF CORRECTION

PATENT NO. : 5,132,344
DATED : July 21, 1992
INVENTOR(S) : Jean-Baptiste Matteodo It is certified that error appears in the above-identified patent and that said Letters Patent is hereby corrected as shown below:

Col. 6, l. 46, should read "Examples 1, 3 and 4"

Col. 10, claim 11, line 4, "plyethylene" should read --polyethylene--

Signed and Sealed this

Seventh Day of December, 1993

Attest:

BRUCE LEHMAN

Attesting Officer          Commissioner of Patents and Trademarks